United States Patent
Nam

(10) Patent No.: US 10,275,865 B2
(45) Date of Patent: Apr. 30, 2019

(54) IMAGE PROCESSING DEVICE AND IMAGE PROCESSING METHOD USING THE SAME

(71) Applicant: LG ELECTRONICS INC., Seoul (KR)

(72) Inventor: Sangchurl Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 35 days.

(21) Appl. No.: 15/294,323

(22) Filed: Oct. 14, 2016

(65) Prior Publication Data

US 2017/0330312 A1 Nov. 16, 2017

(30) Foreign Application Priority Data

May 16, 2016 (KR) .................. 10-2016-0059803

(51) Int. Cl.
*G06T 5/00* (2006.01)

(52) U.S. Cl.
CPC .... *G06T 5/009* (2013.01); *G06T 2207/10016* (2013.01); *G06T 2207/20208* (2013.01)

(58) Field of Classification Search
None
See application file for complete search history.

(56) References Cited

U.S. PATENT DOCUMENTS

| | | | | |
|---|---|---|---|---|
| 2014/0016822 A1* | 1/2014 | Sakamoto | .......... | G06K 9/00624 382/103 |
| 2016/0104438 A1 | 4/2016 | Han et al. | | |

FOREIGN PATENT DOCUMENTS

| KR | 10-2011-0052320 | 5/2011 |
|---|---|---|
| WO | WO 2015/007505 | 1/2015 |
| WO | WO 2015/077329 | 5/2015 |
| WO | WO 2016/038775 | 3/2016 |

OTHER PUBLICATIONS

International Search Report dated Feb. 13, 2017 issued in Application No. PCT/KR2016/009933 (Full English Text).

* cited by examiner

*Primary Examiner* — Qian Yang
(74) *Attorney, Agent, or Firm* — Ked & Associates, LLP

(57) ABSTRACT

There is provided an image processing device comprising: a display panel; and a controller configured to acquire a peak luminance value of a high dynamic range (HDR) image, and adjust a luminance of the high dynamic range image to be within an available output luminance range of the display panel, based on the acquired peak luminance value.

14 Claims, 9 Drawing Sheets

IMAGE PROCESSING DEVICE AND IMAGE PROCESSING METHOD USING THE SAME

CROSS-REFERENCE TO RELATED APPLICATION

This application claims the benefit of Korea patent application No. 10-2016-0059803 filed on May 16, 2016, the entire content of which is incorporated herein by reference for all purposes as if fully set forth herein.

BACKGROUND

Field of the Present Disclosure

The present disclosure relates to an image processing device, and, more particularly, to an image processing device to perform adaptive tone mapping for a HDR high dynamic range image.

Discussion of the Related Art

A dynamic range of a brightness sensitive to a human eye may be in a range of few hundreds thousands to few billons. In terms of a specific brightness unit, a brightness 0.00001 to 1000000 nits may be sensitive to a human eye. Just the dynamic range of few hundreds may suffice to express most of image information and thus a display device to render a general image has a dynamic range of 256. However, in order to form an image similar to a real nature image via a great amount of computing, or to form a medical image requiring very fine data, the image should be expressed using the dynamic range above 256.

That is, the conventional display device may render an image having a standard dynamic brightness range, which may be narrower than a dynamic brightness range sensitive to the human eye. Thus, the conventional display device may have a limitation to allow an image to feel real to the human eye. For this reason, a high dynamic range (HDR) imaging technique appears. The HDR technique may allow a bright region to be brighter and a dark region to be darker, to extend the brightness range to generate the high dynamic range image visible more really to the human eye.

The image subjected to the HDR (hereinafter, HDR image) should be converted to a general image with a limited dynamic range for display by the general display device or print device. For this, a tone mapping operation may be needed to convert the HDR image to a low or standard dynamic range (SDR) image as a general image with a limited dynamic range for display by the general display device or print device.

However, for the HDR image having a bright region and a dark region, the conventional tone mapping may not render the dark region to be clear due to a luminance limit supported by the general display device. Thus, the user may have difficulty in sensing the dark region. Therefore, the HDR image may not be displayed with the intended brightness by the HDR image provider.

SUMMARY

The present disclosure is to adaptively change a tone curve used in tone mapping of a HDR image to provide a bright and clear HDR image.

Further, the present disclosure is to adjust a luminance of a HDR image to be within a luminance output range of a display panel based on a peak luminance value of the HDR image.

In one aspect of the present disclosure, there is provided an image processing device comprising: a display panel; and a controller configured to acquire a peak luminance value of a high dynamic range (HDR) image, and to adjust a luminance of the high dynamic range image to be within an available output luminance range of the display panel, based on the acquired peak luminance value.

In one embodiment, the controller is further configured to adjust the luminance of an image signal region of the high dynamic range image having a luminance value equal to or lower than the peak luminance value.

In one embodiment, the controller is further configured to increase gradually the luminance of the image signal region from a minimum available output luminance value to a maximum available output luminance value of the display panel.

In one embodiment, the controller does not adjust the luminance of an image signal region of the high dynamic range image having a luminance value higher than the peak luminance value.

In one embodiment, the controller is further configured; to acquire peak luminance values of multiple scenes forming the HDR image; to obtain an average peak luminance value of the acquired peak luminance values; and to adjust the luminance of the HDR image within the available output luminance range of the display panel based on the acquired average peak luminance value, wherein each of the multiple scenes includes a predetermined number of image frames.

In one embodiment, the controller is further configured; to acquire peak luminance values of multiple image frames forming the HDR image; to obtain an average peak luminance value of the acquired peak luminance values; and to adjust the luminance of the HDR image within the available output luminance range of the display panel based on the acquired average peak luminance value.

In one embodiment, the controller is further configured; if the peak luminance value is within a predetermined range, to adjust the luminance of the HDR image within the available output luminance range of the display panel based on a maximum available output luminance value of the display panel; or if the peak luminance value is out of the predetermined range, to adjust the luminance of the HDR image within the available output luminance range of the display panel based on the peak luminance value of the HDR image.

In one embodiment, the controller is further configured: to receive metadata including information about the HDR image; and to acquire the peak luminance value of the HDR image from the metadata.

In one embodiment, the controller is further configured to change a static tone curve to an adaptive tone curve based on the acquired peak luminance value, wherein the static tone curve defines an adjustment relationship to allow a luminance of an input HDR image signal to be adjusted within the available output luminance range of the display panel.

In one embodiment, the controller is further configured to perform color mapping to transfer a color of the HDR image to be within a color rendering range of the display panel.

In one aspect of the present disclosure, there is provided an image processing method using an image processing device including a display panel, the method comprising: receiving a high dynamic range (HDR) image; acquiring a peak luminance value of the high dynamic range (HDR) image; and adjusting a luminance of the HDR image to be within an available output luminance range of the display panel, based on the acquired peak luminance value.

Using the method and device of the present disclosure, the tone curve employed in the tone mapping of the HDR image may be adaptively changed to provide a bright and clear HDR image.

Further, a flicker effect due to a sharp change of the peak luminance value may be suppressed.

BRIEF DESCRIPTIONS OF THE DRAWINGS

The present invention will become more fully understood from the detailed description given herein below and the accompanying drawings, which are given by illustration only, and thus are not limitative of the present invention, and wherein.

DETAILED DESCRIPTIONS

Figure 1:
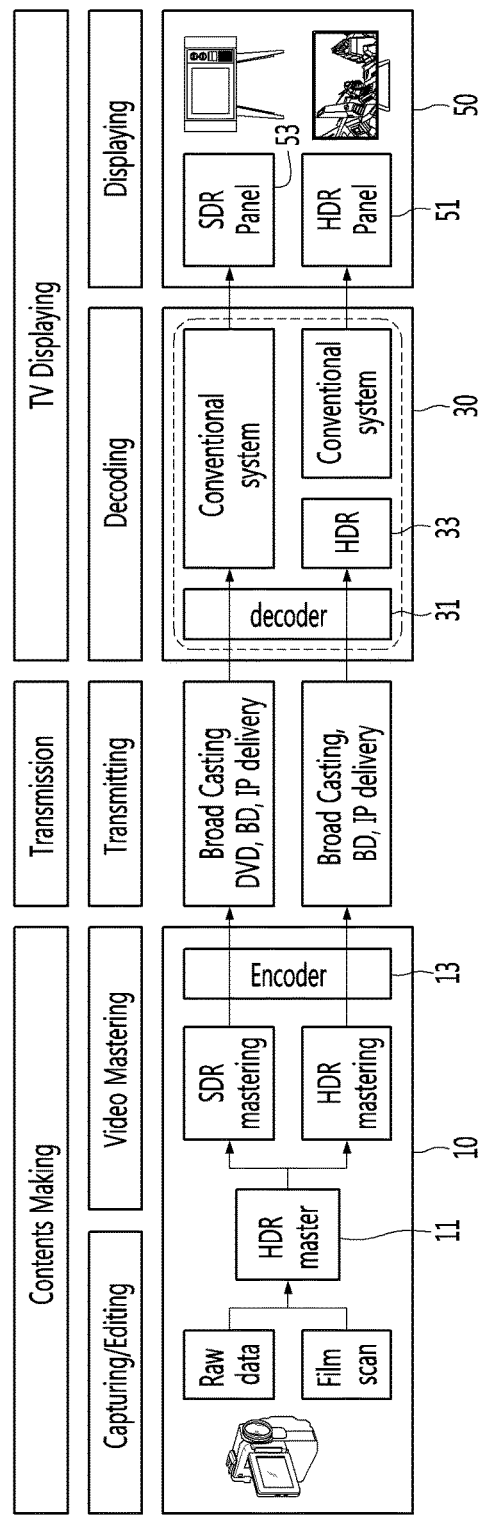
FIG. 1 shows a block diagram of a content provider system to provide SDR and HDR images in accordance with one embodiment of the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that if an element is referred to as being "connected with" another element, the element can be connected with the other element or intervening elements may also be present. In contrast, if an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

An image processing device in accordance with one embodiment of the present disclosure may be, for example, an intelligent display device having a combination of broadcast reception and computer support functions. The image processing device may further have an Internet function. The image processing device may have an interface suitable for a manual input device, a touch screen, or a space remote controller. The image processing device may be connected to Internet and a computer with support of a wired or wireless Internet function to execute an email, web-browsing, backing or gaming function. For this, the image processing device may employ a standardized general-purposed OS.

Thus, the image processing device in accordance with one embodiment of the present disclosure may allow, for example, various applications to be added or removed on the general-purposed OS kernel, leading to execution of a variety of user-friendly functions. The image processing device may include, without limitation, a network TV, HBBTV, smart TV, LED TV, OLED TV, etc. At some cases, the image processing device may be applied to a smartphone.

As used herein, the terms "brightness" and "luminance" may be used interchangeably.

FIG. 1 shows a block diagram of a content provider system to provide SDR and HDR images in accordance with one embodiment of the present disclosure.

Content provider system 1 may include a content provider 10, a processing device 30, and a display device 50.

The content provider 10 may provide an image with a standard dynamic range (hereinafter, SDR image) or a HDR image. The SDR image may correspond to a low dynamic range image.

A HDR master 11 of the content provider 10 may scan a raw data or analog film of an image using a scanner and then convert the scanned data to a digital data to produce a SDR image or HDR image using the digital data. An encoder 13 of the content provider 10 may encode the SDR image or HDR image.

Then, the encoded SDR image may be delivered via a broadcast or IP network to the image processing device 30 or may be distributed in a form of a storage medium such as a DVD, or Blu-ray disc.

The encoded HDR image may be delivered via a broadcast or IP network to the image processing device 30 or may be distributed in a form of a storage medium such as a Blu-ray disc.

A decoder 31 of the processing device 30 may decode the encoded SDR image, and may send the decoded SDR image via a general image processing system to a SDR panel 53 of the display device 50.

The decoder 31 of the processing device 30 may decode the encoded HDR image. Prior to sending the decoded HDR image to the general image processing system, the image processing device 31 of the processing device 30 may perform tone mapping for the decoded HDR image. The tone mapping will be described later. Via the tone mapping, the HDR image may be sent to the general image processing system and then to a HDR panel 53 of the display device 50.

Hereinafter, the image processing device in accordance with one embodiment of the present disclosure will be described in details in terms of a configuration.

Figure 2:
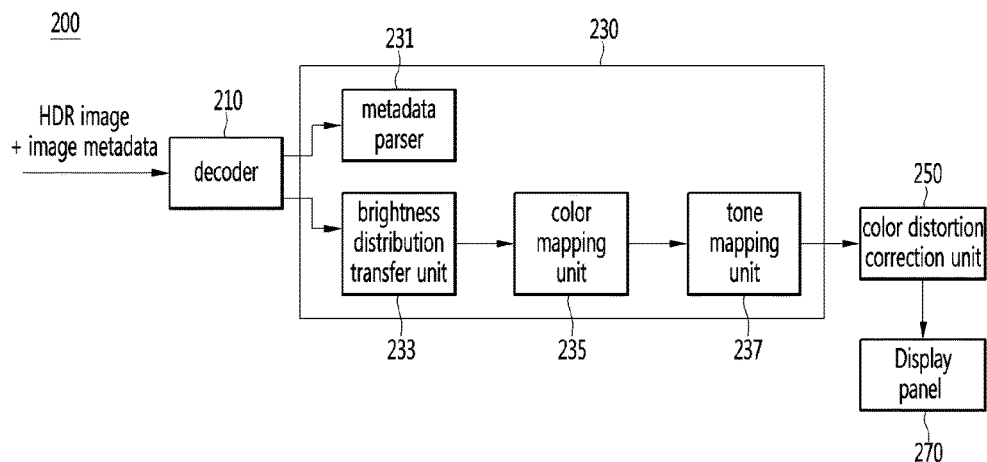
FIG. 2 shows a block diagram of a configuration of an image processing device in accordance with one embodiment of the present disclosure.

FIG. 2 shows a block diagram of a configuration of an image processing device in accordance with one embodiment of the present disclosure.

Referring to FIG. 2, the image processing device 200 in accordance with one embodiment of the present disclosure may include a decoder 210, a controller 230 and a color distortion correction unit 250.

The decoder 210 may receive a HDR image and metadata from the content provider 10. The decoder 210 may decode the HDR image and metadata. The metadata may include information about the HDR image. The metadata may include at least one of a luminance of the HDR image, a maximum brightness per a scene, and an identifier to identifying a current image is a HDR image.

The controller 230 may include a metadata parser 231, a brightness distribution transfer unit 233, a color mapping unit 235, and a tone mapping unit 237.

The metadata parser 231 may parse the decoded metadata.

The metadata parser 231 may send the parsed metadata to the tone mapping unit 237.

The brightness distribution transfer unit 233 may transfer a luminance value of the HDR image to a digital code value using a perceptual quantizer opto-electro transfer function (PQ-OETF). The brightness distribution transfer unit 233 may transfer the digital code value to the luminance value of the HDR image value using a perceptual quantizer electro-optical transfer function (PQ-EOTF). The brightness distribution transfer unit 233 may transfer a luminance range of the HDR image to a digital code range, and then, may back transfer the transferred digital code range to the luminance range. The PQ-OETF may be an inverse function of the PQ-EOTF.

The PQ-EOTF may involve a linearization and scaling for the HDR image. The PQ-EOTF and inverse PQ-EOTF may be defined in a SMPTE (Society of Motion Picture & Television Engineers) standard.

The color mapping unit 235 may re-map a color of the HDR image from the brightness distribution transfer unit 233 based on a color rendering range of the display panel 270.

The tone mapping unit 237 may perform tone mapping for the HDR image from the color mapping unit 235. The tone mapping may refer to a process to convert the HDR image to a LDR image which may be an image with a limited dynamic range as an output range of the display panel 270. The LDR image may refer to the SDR image as described above.

In one embodiment, the tone mapping unit 237 may perform the tone mapping based on a peak luminance value of the display panel set in producing the HDR image. That is, if the HDR image producer masters the HDR image, producer of the HDR image may master the HDR image within a maximum luminance value in an available output luminance range of the display panel. The tone mapping unit 237 may acquire from the metadata parser 231 the maximum luminance value in an available output luminance range of the display panel and then preform the tone mapping. In this case, the tone mapping unit 237 may perform the tone mapping using the static tone curve.

In another embodiment, the tone mapping unit 237 may perform the tone mapping based on histogram information of the HDR image. The histogram information of the HDR image may be generated based on a luminance value of each of pixels of the HDR image. The metadata parser 231 may generate the histogram information based on the luminance value of each of pixels of the HDR image, and then, may send the generated histogram information to the tone mapping unit 237. The tone mapping unit 237 may generate a tone curve based on the histogram information from the metadata parser 231. The tone curve may allow the luminance range of the HDR image to be mapped into the available output luminance range of the display panel 270.

In another embodiment, the tone mapping unit 237 may adjust a luminance of the HDR image to be within the available output luminance range of the display panel 270 based on a peak luminance of the HDR image. The function of the tone mapping unit 237 will be described in details later.

The color distortion correction unit 250 may correct a color distortion of the HDR image subjected to the tone mapping by the tone mapping unit 237. The color distortion correction unit 250 may output the color distortion-corrected HDR image to the display panel 270.

In another embodiment of the present disclosure, the image processing device 200 may further include the display panel 270. The display panel 270 may display an image output from the color distortion correction unit 250. The display panel 270 may be incorporated in the image processing device 200 or otherwise may be a separate component.

Hereinafter, referring to FIG. 3, an image processing method using the image processing device in accordance with one embodiment of the present disclosure will be described in details.

Figure 3:
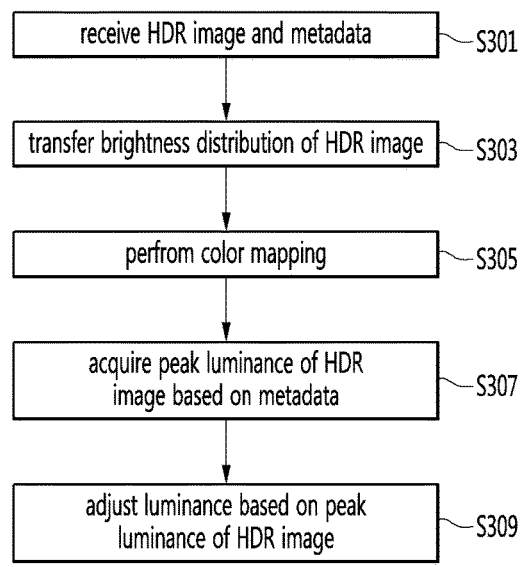
FIG. 3 shows a flow chart of an image processing method using an image processing device in accordance with one embodiment of the present disclosure.

FIG. 3 shows a flow chart of an image processing method using an image processing device in accordance with one embodiment of the present disclosure.

In this case, the image processing method using the image processing device 200 in accordance with one embodiment of the present disclosure will be described with connection to FIG. 1 and FIG. 2.

The controller 230 of the image processing device 200 may receive the HDR image and the metadata including information about the HDR image (S301). The controller 230 may receive the HDR image and metadata from the content provider 10. The controller 230 may receive the HDR image and metadata from the content provider 10 via a broadcast cable or Internet protocol. For this, the controller 230 may include a separate broadcast or Internet communication module.

The metadata may include information on the HDR image. The metadata may include at least one of a luminance of the HDR image, a maximum brightness per a scene, and an indicator to indicate that a current image is a HDR image.

The metadata may be parsed by the metadata parser 231 included in the controller 230. The parsed metadata may be sent to the tone mapping unit 237 for use in the tone mapping for the HDR image.

The brightness distribution transfer unit 233 included in the controller 230 may transfer the brightness distribution of the HDR image S303. In one embodiment, the controller 230 may quantize the brightness information of the HDR image. The controller 230 may transfer the brightness information of the HDR image to the quantization value using the PQ-OETF and PQ-EOTF as described with reference to FIG. 2. This transfer may will be detailed with reference to FIG. 4 and FIG. 5 below.

Figure 4:
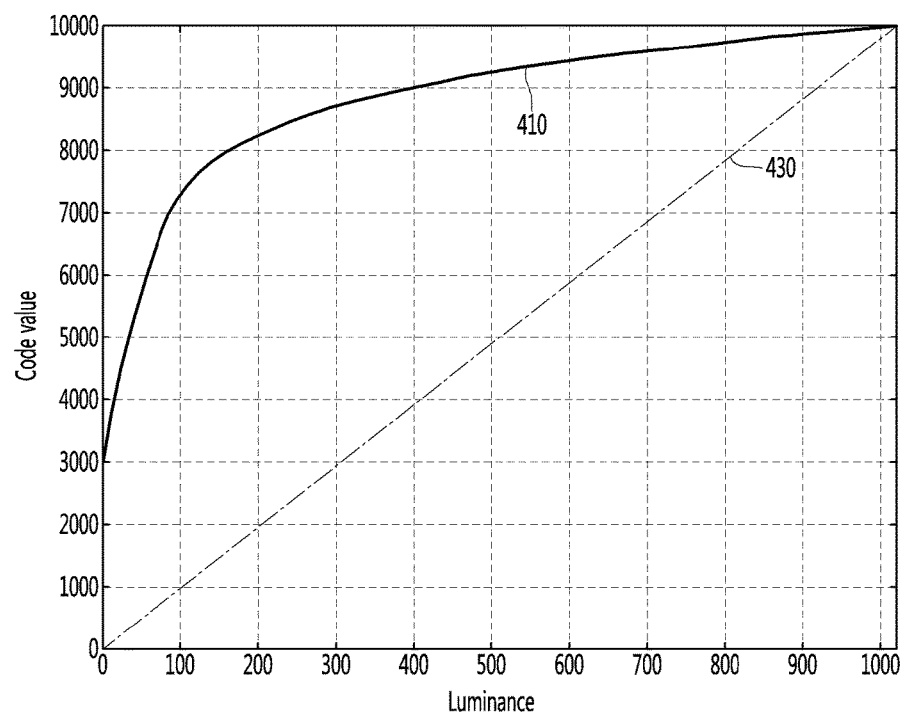
FIG. 4 shows a graph for describing a transfer of a HDR image signal to a quantization level using a perceptual quantizer opto-electro transfer function in accordance with one embodiment of the present disclosure.
Figure 5:
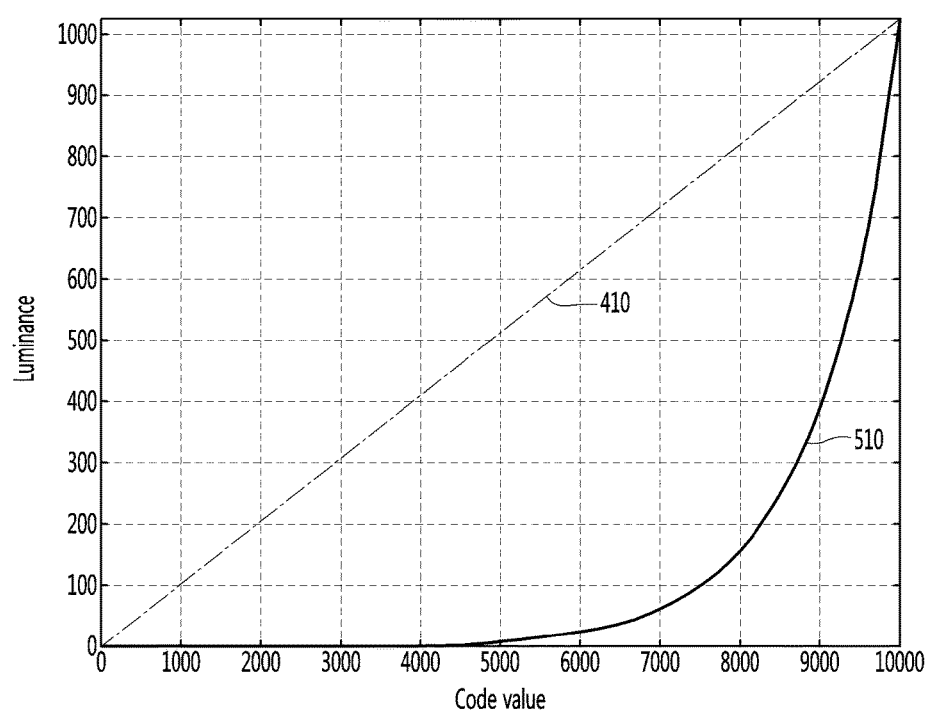
FIG. 5 shows a graph for describing a transfer of a HDR image signal to a quantization level using a perceptual quantizer electro-optical transfer function in accordance with one embodiment of the present disclosure.

FIG. 4 shows a graph for describing a transfer of a HDR image signal to a quantization value using a perceptual quantizer opto-electro transfer function in accordance with one embodiment of the present disclosure. FIG. 5 shows a graph for describing a transfer of a HDR image signal to a quantization value using a perceptual quantizer electro-optical transfer function in accordance with one embodiment of the present disclosure.

In FIG. 4, a horizontal axis indicates a luminance value of the HDR image value, while a vertical axis indicates digital code value.

In FIG. 5, a vertical axis indicates a luminance value of the HDR image value, while a horizontal axis indicates digital code value.

The gamma correction may refer to a correction of a correlation between an image signal input to the display panel and a light amount. The gamma correction may correct the image luminance in a non-linear manner using a non-linear transfer function. This is why a human eye responds to a brightness in a non-linear manner and thus the image data is encoded in a non-linear manner for an optimal image quality.

Referring to FIG. 4, there is shown a first non-linear curve 410 resulting from a quantization of the luminance value of the HDR image to the digital code value using a PQ-OETF scheme as one type of the gamma correction. The brightness distribution transfer unit 233 may further transfer the first non-linear curve 410 to a linear line 430 using the PQ-EOTF. That is, as shown in FIG. 5, the brightness distribution transfer unit 233 may transfer the digital code value to the luminance value in order to transfer the first non-linear curve 410 to the linear line 430 using the PQ-EOTF. In order to transfer the digital code value to the luminance value, the second non-linear curve 510 may be used.

Again, a reference is made to FIG. 3.

The color mapping unit 235 in the controller 230 may perform color mapping for the HDR image with the transferred brightness distribution S305. The color mapping unit 235 may re-map the color of the HDR image within the color rendering range of the display panel 270. The color mapping unit 235 may transfer the color of the HDR image using a gamut mapping technique. The gamut color may refer to a color rendering region of the display panel 270. That is, the color mapping unit 235 may map a HDR image range out of the gamut color into the gamut color. This will be described in details with reference to FIG. 6.

Figure 6:
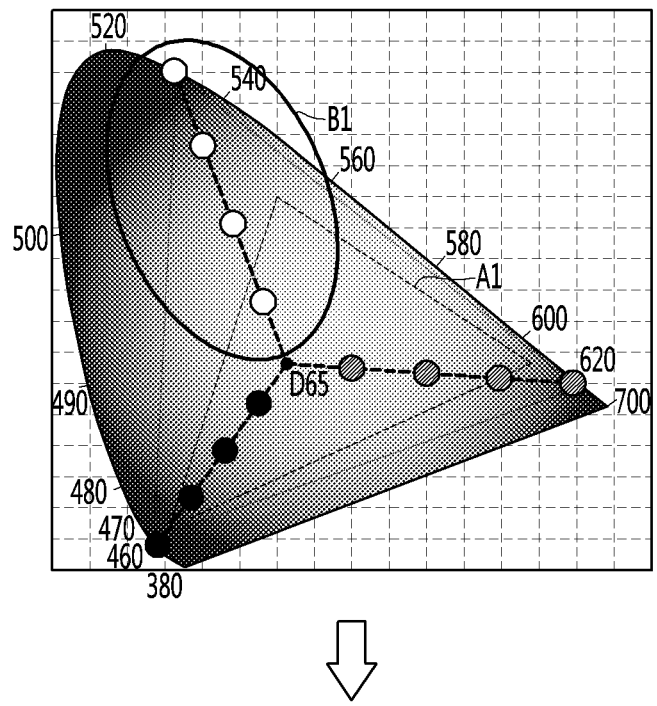
FIG. 6 shows graphs for describing a color mapping of a HDR image in accordance with one embodiment of the present disclosure.
Figure 6:
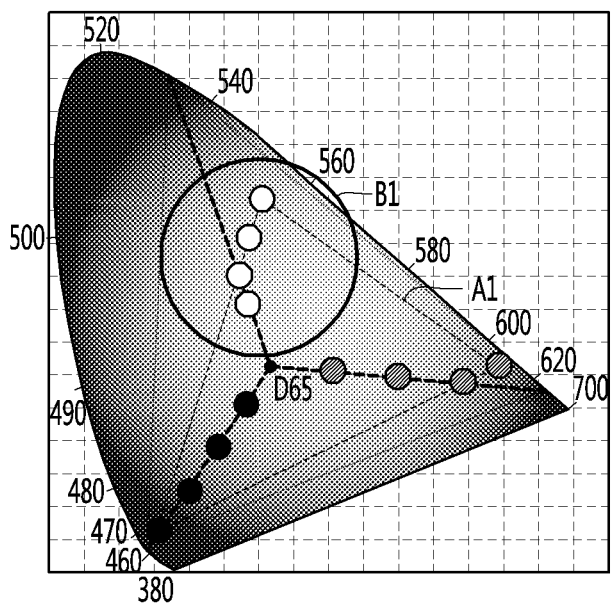

FIG. 6 shows graphs for describing a color mapping of a HDR image in accordance with one embodiment of the present disclosure.

Referring to FIG. 6, a gamut color region A1 is shown and a color region B1 of the HDR image is out of the gamut color region A1. The color mapping unit 235 may map the color region B1 out of the gamut color region A1 into the gamut color region A1 using the gamut mapping technique.

Again, a reference is made to FIG. 3.

The tone mapping unit 237 in the controller 230 may acquire a peak luminance value of the HDR image subjected to the color mapping based on the metadata S307. The tone mapping unit 237 may receive the peak luminance value of the HDR image from the metadata parser 231.

In one embodiment, the peak luminance value of the HDR image may refer to the maximum value among multiple luminance values in a single image frame forming the HDR image. Each of the multiple luminance values may be each luminance value of multiple pixels of the image frame.

In another embodiment, the peak luminance value of the HDR image may refer to the maximum value among multiple luminance values in a certain number of image frames forming the HDR image. For example, if the certain number is 3, the peak luminance value may refer to the highest one among a first maximum luminance value of a first image frame, a second maximum luminance value of a second image frame, and a third maximum luminance value of a third image frame.

The tone mapping unit 237 may adjust the luminance of the HDR image based on the acquired peak luminance value S309. The tone mapping may refer to a process to convert the HDR image to a LDR image which may be an image with a limited dynamic range as an output range of the display panel 270. The tone mapping may reduce a ratio between a dark area and a bright area as an image dynamic range, to adjust the image brightness in a non-linearly.

The tone mapping may refer to a process to translate the HDR image into the available output luminance range of the display panel 270. This may be executed since the display panel 270 has a limited luminance range thereof. Thus, the tone mapping unit 237 may translate the luminance range of the HDR image to the limited available output luminance range of the display panel 270. The tone mapping may secure a sufficient range for a black region of the HDR image and may increasingly limit a dynamic range toward a white region. In this way, the bright region of the image becomes brighter and the dark region become darker, to lead to a clearer image.

In one embodiment, the tone mapping unit 237 may perform the adaptive tone mapping based on the peak luminance value of the HDR image. To be specific, the tone mapping unit 237 may adjust the luminance of the HDR image to be within the available output luminance range of the display panel 270 based on the peak luminance value of the HDR image.

This will be described in details with reference to the drawings below.

Figure 7:
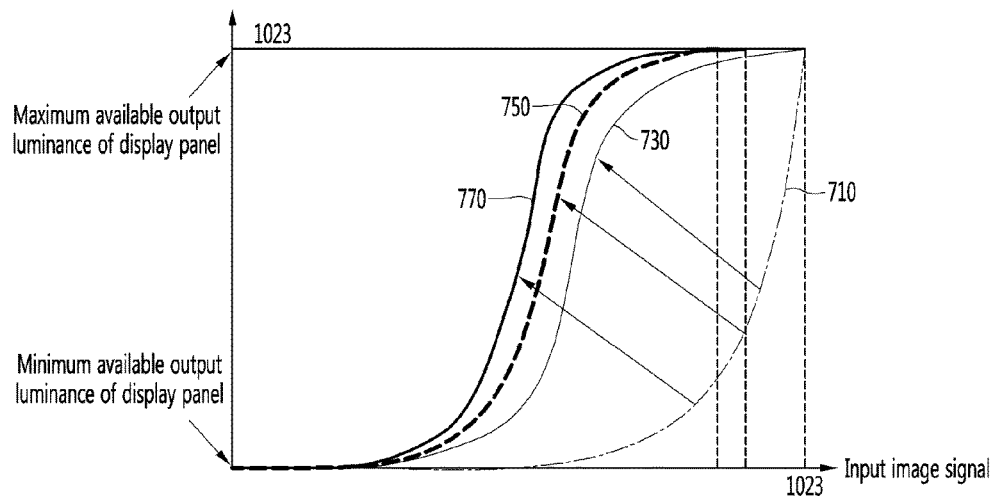
FIG. 7 shows a graph for describing an adaptive tone mapping based on a peak luminance value in accordance with one embodiment of the present disclosure.

FIG. 7 shows a graph for describing an adaptive tone mapping based on a peak luminance value in accordance with one embodiment of the present disclosure.

FIG. 7 shows a graph for describing an adaptive tone mapping preformed for a 10-bit HDR image. The present disclosure is not limited thereto.

In FIG. 7, a horizontal axis indicates an input HDR image signal as a digital value, and a vertical axis indicates a luminance of the display panel 270 as a digital value. To be specific, the horizontal axis indicates the input HDR image data range as a digital value range, and the vertical axis indicates the available output luminance range of the display panel 270 as a digital value range.

The vertical axis has a point 1023 to indicate a digital value corresponding to the maximum available output luminance of the display panel 270, and the vertical axis has a point 0 to indicate a digital value corresponding to the minimum available output luminance of the display panel 270. It may be assumed that the maximum available output luminance value of the display panel 270 is 4000 nits.

In FIG. 7, there is shown a static tone curve 710 for static tone mapping. The static tone mapping may refer to a process to adjust the luminance range of the HDR image based on the maximum available output luminance value of the display panel 270. The static tone curve 710 may refer to a curve generated based on the maximum available output luminance value of the display panel 270. That is, if the maximum available output luminance value of the display panel 270 varies, a form of the static tone curve 710 varies.

In another embodiment, the static tone mapping may refer to a process to adjust the luminance range of the HDR image based on the histogram information of the HDR image. The histogram information of the HDR image may indicate a frequency of occurrences of the pixels having a brightness of the HDR image relative to the brightness of the HDR image. In one embodiment of the present disclosure, the static tone curve 710 is shown in a single manner by way of example. The present disclosure is not limited thereto. The static tone curve 710 may have various forms depending on the histograms of the HDR image.

The tone mapping unit 237 may generate a static tone curve 710 based on the histogram information of the input HDR image. If using the static tone curve 710, the display panel 270 has a limited luminance range, to cause difficulty in distinguishing a dark region of the HDR image. Thus, the user may have difficulty in distinguishing a dark region of the image.

The tone mapping unit 237 may change the static tone curve 710 to one of multiple adaptive tone curves 730, 750, and 770 based on the acquired peak luminance value of the HDR image from the metadata parser 231. The tone mapping unit 237 may include a lookup table having an association between the peak luminance value of the HDR image and adaptive tone curve. To be specific, the lookup table may have a correlation between the peak luminance values of the HDR image and adaptive tone curves.

Figure 8:
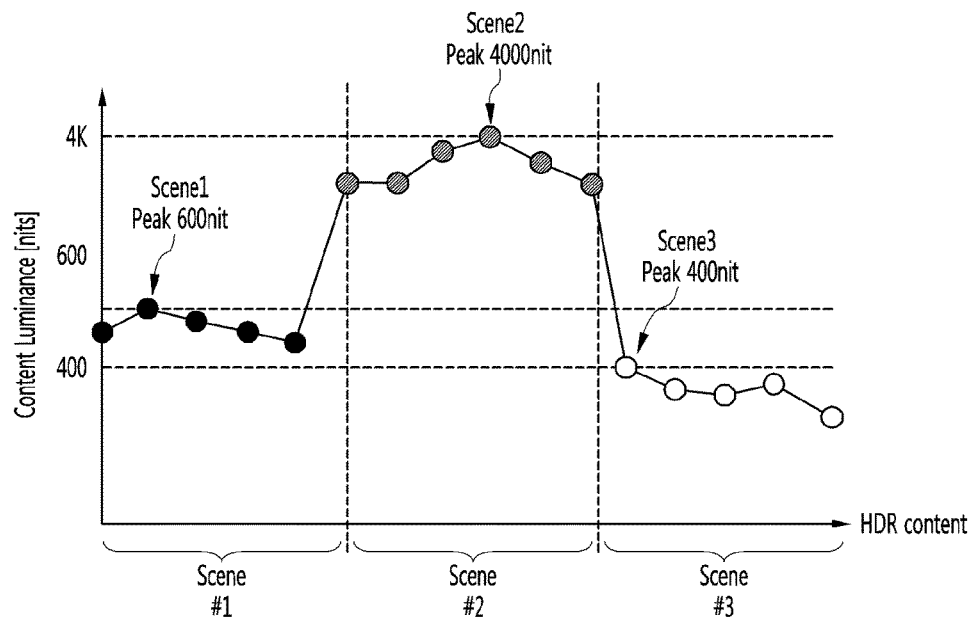
FIG. 8 and FIG. 9 show respectively examples of adaptive changes of a tone curve based on a peak luminance value in accordance with one embodiment of the present disclosure.
Figure 9:
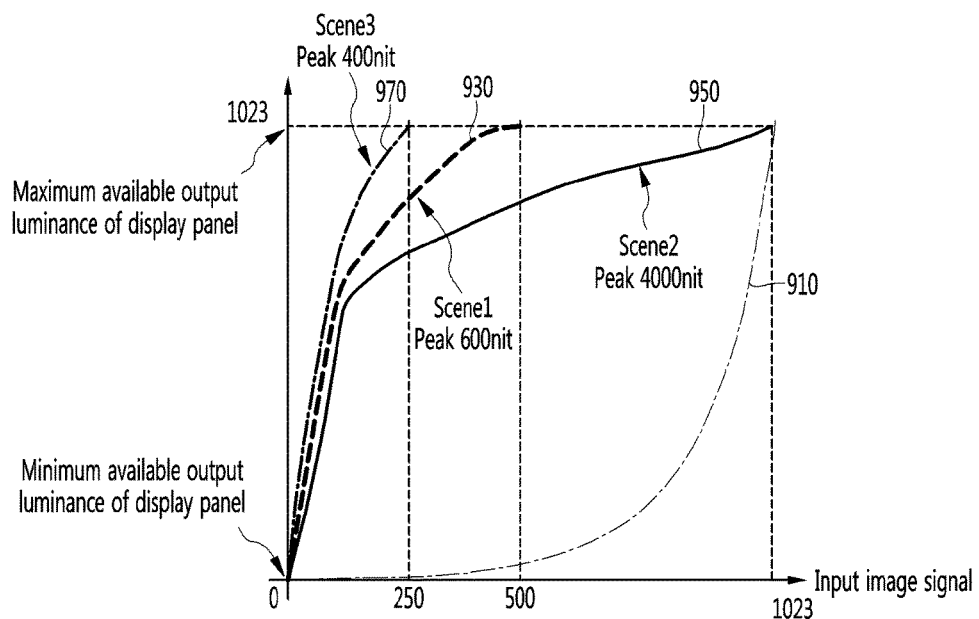

FIG. 8 and FIG. 9 show respectively examples of adaptive changes of a tone curve based on a peak luminance value in accordance with one embodiment of the present disclosure.

In FIG. 9, a horizontal axis and a vertical axis are the same as described with reference to FIG. 7.

Referring to FIG. 8, there is shown a graph of a luminance distribution over each scene of the HDR image. Each scene may include image frames of a still HDR image. The scene may include 3 image frames by way of example. Thus, the present disclosure is not limited thereto. The scene may include only a singe image frame. FIG. 8 shows a graph of a distribution of luminance values respectively corresponding to pixels in each scene the HDR image.

FIG. 8 may also be a graph of a luminance distribution of a single image frame.

A peak luminance value of the first scene may be 600 nits; a peak luminance value of the second scene may be 4000 nits; and a peak luminance value of the third scene may be 400 nits. The tone mapping unit 237 may acquire each peak luminance value of each scene from the metadata parser 231.

As shown in FIG. 9, the tone mapping unit 237 may change a static tone curve 910 to one of multiple adaptive tone curves 930, 950, and 970 based on each peak luminance value of each scene. That is, the tone mapping unit 237 may adjust the luminance of the HDR image within the available output luminance range of the display panel 270 based on each peak luminance value of each scene.

The tone mapping unit 237 may adjust an input luminance range of the HDR image using the first adaptive tone curve 930 corresponding to the peak luminance value 600 nits of the first scene. Since the peak luminance value of the first scene is 600 nits, image signal regions corresponding to the luminance ranges exceeding 600 nits and below 4000 nits, (for example, data regions corresponding to 501 to 1023) may not contain any luminance information. In this case, if, using the static tone curve 910, the luminance range of the first scene is adjusted, the image signal regions not containing the luminance information may be subjected to the tone mapping.

Thus, the tone mapping unit 237 may change the static tone curve 910 to the first adaptive tone curve 930 corresponding to the peak luminance value of the first scene. The tone mapping unit 237 may adjust luminance of first image signal regions (0 to 500) having a luminance value lower than or equal to the peak luminance value 600 nits to be within the maximum available output luminance range of the display panel 270. To be specific, the tone mapping unit 237 may adjust the luminance of the HDR image to increase gradually the luminance of the first image signal region from the minimum available output luminance value to the maximum luminance value of the display panel 270. That is, the luminance of the first image signal region may be adjusted to follow the first adaptive tone curve 930.

Since second image signal regions (501 to 1023) of the first scene do not contain the HDR image data information, the tone mapping unit 237 may not adjust the luminance of the second image signal regions (501 to 1023).

The tone mapping unit 237 may adjust the input luminance range of the HDR image using the second adaptive tone curve 950 corresponding to the peak luminance value 4000 nits of the second scene. The peak luminance value of the second scene is 4000 nits, and thus, the maximum available output luminance value of the display panel 270 is 4000 nits.

The tone mapping unit 237 may change the static tone curve 910 to the second adaptive tone curve 950 corresponding to the peak luminance value of the second scene. The tone mapping unit 237 may adjust a luminance range of an entire image signal to the maximum available output luminance range of display panel 270. To be specific, the tone mapping unit 237 may adjust the luminance of the HDR image to gradually increase the luminance of the image signal region from the minimum available output luminance value of the display panel 270 to the maximum available output luminance value. That is, the luminance value of the entire image signal may be higher using the second adaptive tone curve 950 than using the static tone curve 910.

That is, the luminance of the image signal region may be adjusted to follow the second adaptive tone curve 950.

The tone mapping unit 237 may adjust the input luminance range of the HDR image using the third adaptive tone curve 970 corresponding to the peak luminance value 400 nits of the third scene. Since the peak luminance value of the third scene is 400 nits, image signal regions corresponding to the luminance ranges exceeding 400 nits and below 4000 nits, (for example, data regions corresponding to 250 to 1023) may not contain any luminance information. In this case, if, using the existing static tone curve 910, the luminance range of the third scene is adjusted, the image signal regions not containing the luminance information may be subjected to the tone mapping.

Thus, the tone mapping unit 237 may change the static tone curve 910 to the third adaptive tone curve 970 corresponding to the peak luminance value of the third scene. The tone mapping unit 237 may adjust the luminance of third image signal regions (0 to 250) having a luminance value lower than or equal to the peak luminance value 400 nits to be within the maximum available output luminance range of the display panel 270. To be specific, the tone mapping unit 237 may adjust the luminance of the HDR image to increase gradually the luminance of the third image signal regions from the minimum available output luminance value to the maximum luminance value of the display panel 270. That is, the luminance of the third image signal regions may be adjusted to follow the third adaptive tone curve 970.

Since fourth image signal regions (251 to 1023) of the third scene do not contain the HDR image data information, the tone mapping unit 237 may not adjust the luminance of the fourth image signal regions (251 to 1023).

If performing the adaptive tone mapping, a flicker effect may occur due to the rapid change of the peak luminance value of the HDR image. For example, if a full black image is changed to a full white image, vice-versa, the rapid change of the peak luminance value of the HDR image may occur.

In order to remove the flicker, the controller 230 may perform peak luminance filtering or smoothing filtering.

In another embodiment, in order to suppress a load of the image processing device 200 due to excessive tone mapping, the controller 230 may be configured: if the acquired peak luminance value is within a predetermined range, to perform static tone mapping for the HDR image, or if the peak luminance value exceeds the predetermined range, to perform the adaptive tone mapping for the HDR image.

In still another embodiment of the present disclosure, adaptive tone mapping may be performed based on an average value of the peak luminance values of multiple HDR scenes.

Figure 10:
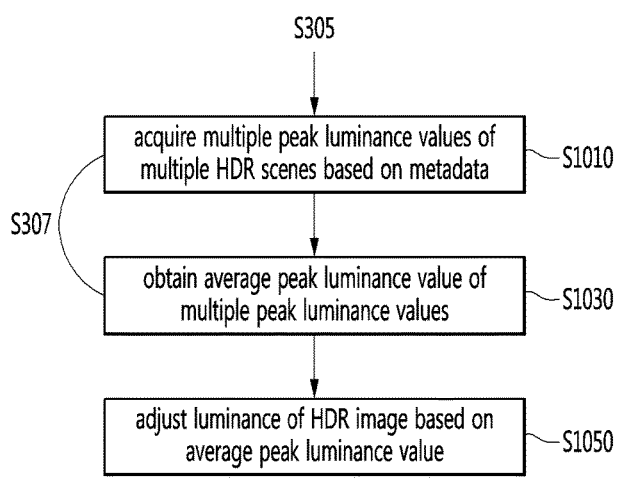
FIG. 10 to FIG. 11 show an example of adaptive tone mapping based on an average value of peak luminance values of HDR scenes in accordance with another embodiment of the present disclosure.
Figure 11:
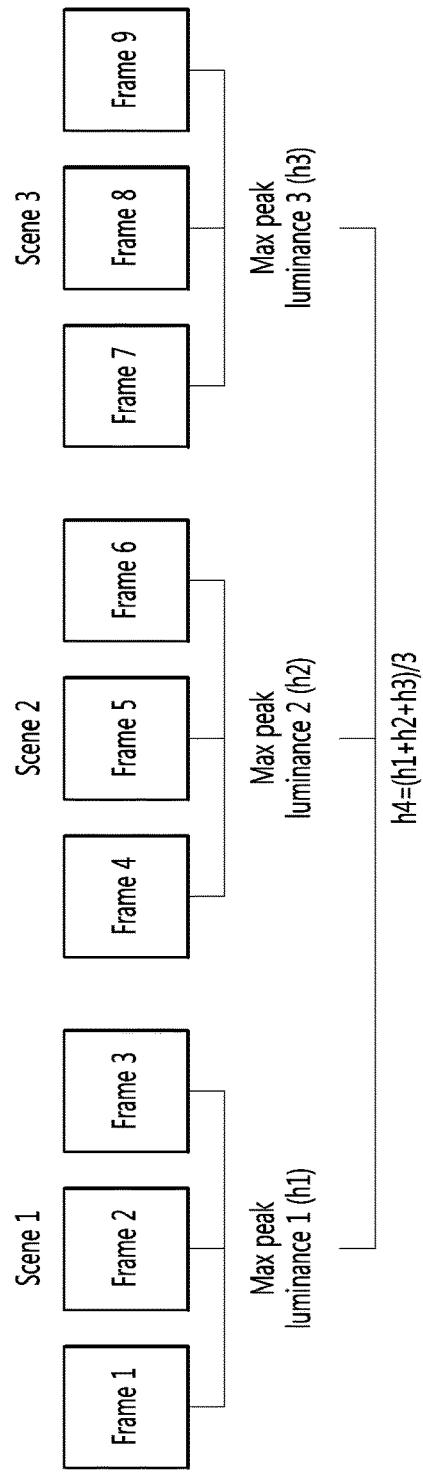

FIG. 10 to FIG. 11 show an example of adaptive tone mapping based on an average value of peak luminance values of HDR scenes in accordance with another embodiment of the present disclosure.

Hereinafter, the overlapping contents with those in FIG. 3 may be skipped. A following embodiment may be directed to a process after the operation S301 to operation S305 in FIG. 3. That is, the following embodiment may embody the operations S307 and S309 more specifically.

In particular, an operation S1010 and an operation S1030 may embody the operation S307 more specifically. An operation S1050 may embody the operation S309 more specifically.

After the operation S305 in FIG. 3, the tone mapping unit 237 of the image processing device 200 may acquire peak luminance values of multiple HDR scenes based on the metadata S1010. Each HDR scene may include multiple image frames. Each HDR scene may include three image frames by way of example. The present disclosure may not be limited thereto.

Referring to FIG. 11, three scenes (scenes 1,2,3) each may include three image frames. That is, the first scene (scene 1) may include first to third image frames; the second scene (scene 2) may include fourth to sixth image frames; and the third scene (scene 3) may include seventh to ninth image frames. The tone mapping unit 237 may acquire each peak luminance value of each of the first image frame (frame 1) to third image frame (frame 3) from the metadata parser 231, and then, obtain the maximum value h1 among the three peak luminance values. The tone mapping unit 237 may acquire each peak luminance value of each of the fourth image frame (frame 4) to sixth image frame (frame 6) from the metadata parser 231, and then, obtain the maximum value h2 among the three peak luminance values. The tone mapping unit 237 may acquire each peak luminance value of each of the seventh image frame (frame 7) to ninth image frame (frame 9) from the metadata parser 231, and then, obtain the maximum value h3 among the three peak luminance values.

The tone mapping unit 237 may obtain an average peak luminance value of the acquired peak luminance values S1030. As shown in FIG. 11, the tone mapping unit 237 may obtain the average peak luminance value as an average h4=(h1+h2+h3)/3.

The tone mapping unit 237 may adjust the luminance of the HDR image based on the acquired average peak luminance value S1050. The tone mapping unit 237 may perform the adaptive tone mapping based on the acquired average luminance value with reference to FIG. 7 to FIG. 9.

If preforming the adaptive tone mapping using the embodiment of FIG. 10 and FIG. 11, a load applied to the image processing device 200 may be lower than if changing the tone curve per each image frame. Further, the flicker may be suppressed.

In still another embodiment of the present disclosure, adaptive tone mapping may be performed based on an average value of the peak luminance values of multiple image frames.

Figure 12:
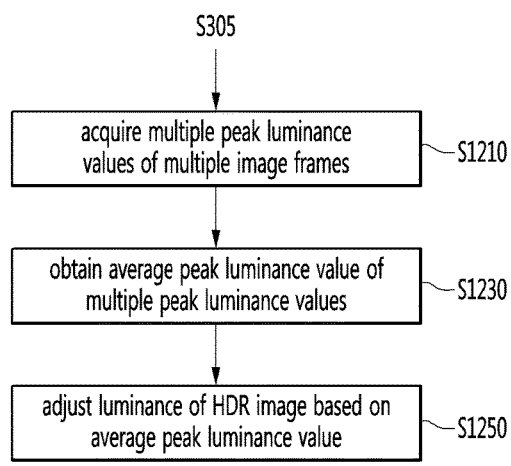
FIG. 12 and FIG. 13 show an example of adaptive tone mapping based on an average value of peak luminance values of image frames in accordance with another embodiment of the present disclosure.
Figure 13:
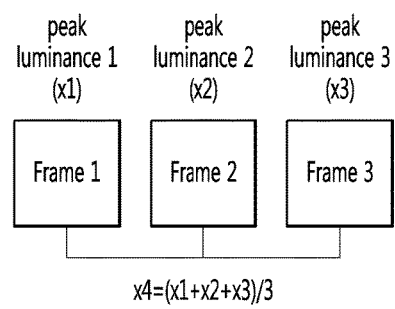

FIG. 12 to FIG. 13 show an example of adaptive tone mappings based on an average value of peak luminance values of multiple image frames in accordance with another embodiment of the present disclosure.

Hereinafter, the overlapping contents with those in FIG. 3 may be skipped. A following embodiment may be directed to a process after the operation S301 to operation S305 in FIG. 3. That is, the following embodiment may embody the operations S307 and S309 more specifically.

In particular, an operation S1210 and an operation S1230 may embody the operation S307 more specifically. An operation S1250 may embody the operation S309 more specifically.

After the operation S305 in FIG. 3, the tone mapping unit 237 of the image processing device 200 may acquire peak luminance values of multiple image frames based on the metadata S1210. Each HDR scene may include multiple image frames. Referring to FIG. 13, the tone mapping unit 237 of the image processing device 200 may acquire the peak luminance values of a certain number of image frames, which may be, for example, three image frames. The present disclosure may not be limited thereto.

The tone mapping unit 237 may acquire the peak luminance values (x1, x2, x3) of the first image frame (frame 1) to the third image frame (frame 3) respectively from the metadata parser 231.

The tone mapping unit 237 may acquire an average peak luminance value of the acquired peak luminance values S1230. The tone mapping unit 237 may acquire an average peak luminance value as the average x4=(x1+x2+x3)/3 as shown in FIG. 13.

The tone mapping unit 237 may adjust the luminance of the HDR image based on the acquired average peak luminance value S1250. The tone mapping unit 237 may perform the adaptive tone mapping based on the acquired average luminance value with reference to FIG. 7 to FIG. 9.

If preforming the adaptive tone mapping using the embodiment of FIG. 12 and FIG. 13, a load applied to the image processing device 200 may be lower than if changing the tone curve per each image frame. Further, the flicker may be suppressed.

A non-transitory computer readable storage medium having stored thereon computer program instructions which performs the image processing method according to exemplary embodiments may be provided. The non-transitory computer readable storage medium refers to a medium where data can be stored semi-permanently and is readable by a device, and not a medium which stores data for a short period of time such as a register, cache, and memory etc. More specifically, the aforementioned various applications or programs may be stored in and provided by non-transitory computer readable medium such as a CD, DVD, hard disk, blue ray disk, USB, memory card, and ROM etc.

In one or more exemplary embodiments, the methods may be recorded, stored, or fixed in one or more non-transitory computer-readable media (computer readable storage (recording) media) that includes program instructions (computer readable instructions) to be implemented by a computer to cause one or more processors to execute (perform or implement) the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher value code that may be executed by the computer using an interpreter. The program instructions may be executed by one or more processors. The described hardware devices may act as one or more software modules that are recorded, stored, or fixed in one or more non-transitory computer-readable media, in order to perform the operations and methods described above, or vice versa. In addition, a non-transitory computer-readable medium may be distributed among computer systems connected through a network and program instructions may be stored and executed in a decentralized manner. In addition, the computer-readable media may also be embodied in at least one application specific integrated circuit (ASIC) or Field Programmable Gate Array (FPGA).

Although a few exemplary embodiments have been shown and described, it would be appreciated by those skilled in the art that changes may be made in these exemplary embodiments without departing from the principles and spirit of the disclosure, the scope of which is defined in the claims and their equivalents.

What is claimed is:

1. An image processing device comprising:
a display panel configured to display a high dynamic range (HDR) image received from a content provider;
a metadata parser configured to parse luminance information of the image; and
a tone mapping unit configured to:
obtain a peak luminance value of the HDR image from the parsed luminance information of the HDR image;
determine whether the peak luminance value is within a predetermined range;
if the peak luminance value is within the predetermined range, adjust a luminance of the HDR image within an available output luminance range of the display panel using a static tone curve generated based on a maximum available output luminance value of the display panel; and
if the peak luminance value is outside of the predetermined range, adjust the luminance of the HDR image within the available output luminance range of the display panel using an adaptive tone curve that is generated by modifying the static tone curve based on the peak luminance value of the HDR image.

2. The device of claim 1, wherein the tone mapping unit is further configured to adjust luminance of an image signal region of the HDR image having a luminance value equal to or lower than the peak luminance value.

3. The device of claim 2, wherein the tone mapping unit is further configured to increase gradually the luminance of the image signal region from a minimum available output luminance value to the maximum available output luminance value of the display panel.

4. The device of claim 1, wherein the tone mapping unit is further configured to:
acquire peak luminance values of multiple scenes forming the HDR image;
obtain an average peak luminance value of the acquired peak luminance values; and
adjust the luminance of the HDR image within the available output luminance range of the display panel based on the acquired average peak luminance value,
wherein each of the multiple scenes includes a predetermined number of image frames.

5. The device of claim 1, wherein the tone mapping unit is further configured to:
acquire peak luminance values of multiple image frames forming the HDR image;
obtain an average peak luminance value of the acquired peak luminance values; and
adjust the luminance of the HDR image within the available output luminance range of the display panel based on the acquired average peak luminance value.

6. The device of claim 1, wherein the tone mapping unit is further configured to:
receive metadata including information about the HDR image; and
acquire the peak luminance value of the HDR image from the metadata.

7. The device of claim 1, wherein the tone mapping unit is further configured to perform color mapping to transfer a color of the HDR image to be within a color rendering range of the display panel.

8. An image processing method using an image processing device including a display panel, the method comprising:
receiving a high dynamic range (HDR) image;
parsing luminance information of a high dynamic range (HDR) image;
receiving a peak luminance value of the HDR image;
determining whether the peak luminance value is within a predetermined range;
if the peak luminance value is within the predetermined range, adjusting the luminance of the HDR image within the available output luminance range of the display panel using a static tone curve generated based on a maximum available output luminance value of the display panel; and
if the peak luminance value is outside of the predetermined range, adjusting the luminance of the HDR image within the available output luminance range of the display panel using an adaptive tone curve that is generated by modifying the static tone curve based on the peak luminance value of the HDR image.

9. The method of claim 8, wherein the adjusting the luminance of the HDR image comprises adjusting the luminance of an image signal region of the HDR image having a luminance value equal to or lower than the peak luminance value.

10. The method of claim 9, wherein the adjusting the luminance of the HDR image comprises increasing gradually the luminance of the image signal region from a minimum available output luminance value to a maximum available output luminance value of the display panel.

11. The method of claim 8, wherein the acquiring the peak luminance value of the HDR image comprises:
   acquiring peak luminance values of multiple scenes forming the HDR image; and
   obtaining an average peak luminance value of the acquired peak luminance values,
   wherein the adjusting the luminance of the HDR image comprises adjusting the luminance of the HDR image within the available output luminance range of the display panel based on the acquired average peak luminance value,
   wherein each of the multiple scenes includes a predetermined number of image frames.

12. The method of claim 8, wherein the acquiring the peak luminance value of the HDR image comprises:
   acquiring peak luminance values of multiple image frames forming the HDR image; and
   obtaining an average peak luminance value of the acquired peak luminance values,
   wherein the adjustment of the luminance of the HDR image comprises adjusting the luminance of the HDR image within the available output luminance range of the display panel based on the acquired average peak luminance value.

13. The method of claim 8, further comprising:
   receiving metadata including information about the HDR image, wherein the acquiring the peak luminance value of the HDR image comprises acquiring the peak luminance value of the HDR image from the metadata.

14. The method of claim 8, further comprising performing color mapping to transfer a color of the HDR image to be within a color rendering range of the display panel.

\* \* \* \* \*